(12) United States Patent
Litwin

(10) Patent No.: US 8,134,981 B2
(45) Date of Patent: Mar. 13, 2012

(54) CORRELATOR FOR PRIMARY CELL SEARCH USING MEMORY ARCHITECTURE

(75) Inventor: Louis Robert Litwin, Edison, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 973 days.

(21) Appl. No.: 11/989,060

(22) PCT Filed: Jul. 26, 2005

(86) PCT No.: PCT/US2005/026453
§ 371 (c)(1),
(2), (4) Date: Jan. 18, 2008

(87) PCT Pub. No.: WO2007/018497
PCT Pub. Date: Feb. 15, 2007

(65) Prior Publication Data
US 2009/0135782 A1    May 28, 2009

(51) Int. Cl.
*H04B 1/707* (2006.01)
*G06F 13/40* (2006.01)
(52) U.S. Cl. .................. 370/335; 370/342; 375/142
(58) Field of Classification Search ................ 370/331, 370/335, 341, 342; 375/142
See application file for complete search history.

(56) References Cited

U.S. PATENT DOCUMENTS

| | | | |
|---|---|---|---|
| 4,791,599 A | 12/1988 | Hethuin et al. | |
| 5,386,532 A * | 1/1995 | Sodos | 710/22 |
| 5,896,304 A * | 4/1999 | Tiemann et al. | 708/5 |
| 6,173,008 B1 * | 1/2001 | Lee | 375/148 |
| 6,882,682 B1 | 4/2005 | Tanaka | |
| 6,990,141 B1 | 1/2006 | Iwasaki | |
| 7,072,384 B2 | 7/2006 | Tanaka | |
| 7,095,778 B2 | 8/2006 | Okubo et al. | |
| 7,492,809 B2 * | 2/2009 | Wang et al. | 375/150 |
| 2003/0202569 A1 | 10/2003 | Kim et al. | |

FOREIGN PATENT DOCUMENTS

| | | |
|---|---|---|
| EP | 1096693 | 5/2001 |
| EP | 1152544 | 11/2001 |
| EP | 1391999 | 2/2004 |
| JP | 2001136103 A * | 5/2001 |
| JP | 20029672 | 1/2002 |
| JP | 2004222152 | 8/2004 |
| JP | 2005117265 | 4/2005 |

OTHER PUBLICATIONS

International Search Report, dated Mar. 7, 2006.
May, Thomas, et al. "Turbo Decoding of Convolutional Codes in Differentially Modulated OFDM Transmission Systems", PUB-Vehicular Technology Conference, 1999 IEEE 49th Houston, TX, USA May 16-20, 1999, May T.; Rohling H, pp. 1891-1895.

* cited by examiner

Primary Examiner — Dang Ton
Assistant Examiner — Robert M Morlan
(74) Attorney, Agent, or Firm — Robert D. Shedd; Jeffrey M. Navon; Catherine A. Cooper

(57) ABSTRACT

An apparatus including a second stage correlator for receiving input data from a first stage correlator, wherein said second stage correlator includes a memory is described. A method for performing a second stage correlation on data including resetting a read pointer and a write pointer, alternatively multiplexing input data into one of a pair of storage registers, concatenating contents of the pair of storage registers, writing the concatenated contents into a memory in accordance with the write pointer, outputting the concatenated contents from the memory into a read register in accordance with the read pointer, updating the read address pointer and updating the write address pointer is also described.

7 Claims, 3 Drawing Sheets

US 8,134,981 B2

CORRELATOR FOR PRIMARY CELL SEARCH USING MEMORY ARCHITECTURE

This application claims the benefit, under 35 U.S.C. §365 of International Application PCT/US2005/026453, filed 26 Jul. 2005, which was published in accordance with PCT Article 21(2) on 15 Feb. 2007.

FIELD OF THE INVENTION

The present invention relates to mobile terminals and in particular to correlators used in the primary cell search.

BACKGROUND OF THE INVENTION

The basic unit of time in UMTS radio signals is a 10 milli-second (ms) radio frame, which is divided into 15 slots of 2560 chips each. UMTS radio signals from a cell (or base station) to a UMTS receiver are "downlink signals," while radio signals in the reverse direction are termed "uplink signals."

The physical layer of the universal mobile telecommunication system (UMTS) wideband code-division multiple access (WCDMA) standard uses direct sequence spread spectrum (DSSS) modulation with a chip rate of 3.84 Mcps. The frequency division duplex (FDD) mode carries the uplink and the downlink channels on separate frequency bands of 5 MHz each. This mode is typically used for large outdoor cells because it can support a larger number of users than time division duplex (TDD) mode. In TDD mode, the transmissions share the same uplink and downlink channels during different time slots. The TDD mode does not support as many users as the FDD mode, and hence, TDD mode is more suitable for smaller cells. TDD mode is also more suited for carrying asymmetric traffic compared to FDD mode.

An important procedure performed by a receiver within a UMTS network, for example a CDMA mobile receiver, is the cell search operation. Cell searching typically is performed by a cell search system that is incorporated as part of the receiver. The cell search system is activated after the receiver is powered on to determine synchronization information pertaining to the cell in which the receiver is located. The cell search operation is a three-stage process. That is, the cell search system performs slot synchronization (primary synchronization), frame synchronization and scrambling code group determination (secondary synchronization), and scrambling code determination.

After power-up, the mobile terminal (MT) has to perform several operations before voice/data communications can begin. First, the receiver needs to implement automatic gain control (AGC) in order to scale the received signal power and prevent clipping at the analog-to-digital converter. This process first can be performed on the synchronization channel (SCH) and later the descrambled common pilot channel (CPICH) can be used once the cell's scrambling code is acquired.

Next the receiver needs to acquire timing synchronization. Timing synchronization can be achieved from the SCH channel. The MT searches for the strongest SCH signal that it can find and that signal determines with which cell the MT will initiate communications. Since the SCH channel is periodic, the receiver can correlate against the primary SCH to derive a timing error. Based on this channel, the receiver can achieve chip, symbol and slot synchronization.

The primary SCH carries the same signal for all cells in the system. The secondary SCH is different for each cell and carries a pattern of secondary synchronization codes (SSCs) that repeat every frame. Once the MT receives this sequence, it will have frame synchronization.

In performing cell searching, the cell search system accesses a synchronization channel (SCH) and a common pilot channel (CPICH) of the received wireless signal. The SCH is a composite channel formed from a primary SCH and a secondary SCH. Within each slot, the primary SCH specifies a primary synchronization code (PSC). The primary SCH, however, only contains data during the first 256 chips of each 2560 chip slot. As is known, "chip" or "chip rate" refers to the rate of the spreading code within a CDMA communication system.

In addition, the pattern identifies to which scrambling code group the current cell's scrambling code belongs. There are 64 scrambling code groups and each group contains eight scrambling codes. Once the MT has determined the current cell's scrambling code group, the search for the current cell's scrambling code is narrowed to the eight codes in that group.

The typical acquisition process for a carrier based receiver is as follows:
1. Primary Cell Search
2. Secondary Cell Search
3. Scrambling Code Determination
4. Multipath Searching
5. Finger Assignment
6. Locking of Code Tracking and Automatic Frequency Control (AFC) loops
7. Maximal Ratio Combining (MRC) of finger output
8. Receiver lock is acquired and data can be sent to upper layers This acquisition process is long and involved and can take on the order of several seconds to complete.

The problem addressed is how to implement an area-efficient correlation block for the second stage of the Primary Cell Search processing in a 3G WCDMA receiver. The first stage of the Primary Cell Search processing involves correlating 16 successive samples in a row and generating a correlation output every 16 chips. Thus, the storage requirements for the first stage correlator are that it only needs to store 16 chips at a time for a given correlation, which is relatively simple to do. Even for a receiver that is using 4 samples per chip, the storage requirements are still only 256 samples and they are successive samples. This means that the first stage correlator processes a contiguous group of samples as they arrive.

Each correlation in the second stage of processing also requires 16 chips. However, because of the nature of the hierarchical Golay codes used in the 3G WCDMA standard, each of these 16 chips is located 16 chips apart. Thus, for a receiver that uses 4 samples per chip, 256 chips still need to be processed, but they are not contiguously located. Instead, a given correlation needs 256 chips located 16*4=64 samples apart. In order to store all the samples needed for a given second stage correlation, the receiver would require a tapped delay line with 1024 locations (16 chips located 16 chips apart is 256 chips, and 4 samples per chip is 1024 samples). The prior art has used a register-based design to implement the second stage correlation. This number of registers (e.g., 1024) is not practical in an ASIC design because it consumes a large amount of die space on the ASIC. Thus, a more area-efficient approach would be advantageous.

SUMMARY OF THE INVENTION

The present invention is an architecture for the second hierarchical stage of correlators used in the Primary Cell Search processing of a 3G WCDMA receiver. The architecture used is memory-based and allows the design to be area-efficient in terms of die space available on an ASIC.

The present invention uses a memory-based approach because, for a given number of locations, a memory is more efficient than registers. However, the nature of a dual-port RAM memory block means that the number of memory reads/writes that can be performed in a given clock cycle is limited to one read and one write per cycle. This presented some challenges in the design of the block since this did not allow enough reads and writes to enable the full processing to be done within the constraint of the receiver's 32 clock cycles per chip. Several features were added to the architecture in order to use a single read and single write per clock cycle to accomplish the desired processing within 32 clock cycles per chip.

An apparatus including a second stage correlator for receiving input data from a first stage correlator, wherein said second stage correlator uses a memory architecture is described. A method for performing a second stage correlation on data including resetting a read pointer and a write pointer, alternatively multiplexing input data into one of a pair of storage registers, concatenating contents of the pair of storage registers, writing the concatenated contents into a memory in accordance with the write pointer, outputting the concatenated contents from the memory into a read register in accordance with the read pointer, updating the read address pointer and updating the write address pointer is also described.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Figure 1:
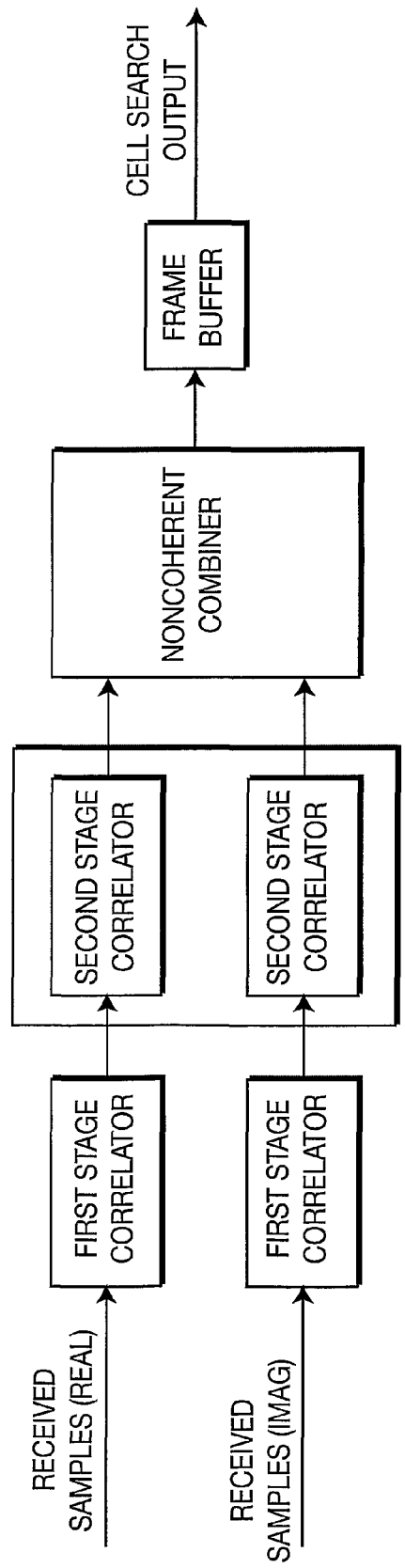
FIG. 1 is a top-level block diagram of cell search processing.

Cell searches are performed in mobile terminals. Referring now to FIG. 1, which is a top-level block diagram of cell search processing, the present invention involves the correlators 125, 130 used in the second stage of the primary cell search, which receive real 115 and imaginary inputs 120 from the first stage correlators 105, 110 of the primary cell search. The output of first stage primary cell search correlators 105, 110 is input to second stage correlators 125, 130. The output of the second stage correlators 125, 130 is output to non-coherent combiner 135, which provides input to frame buffer 140. Frame buffer 140 provides the results of the cell search.

Figure 2:
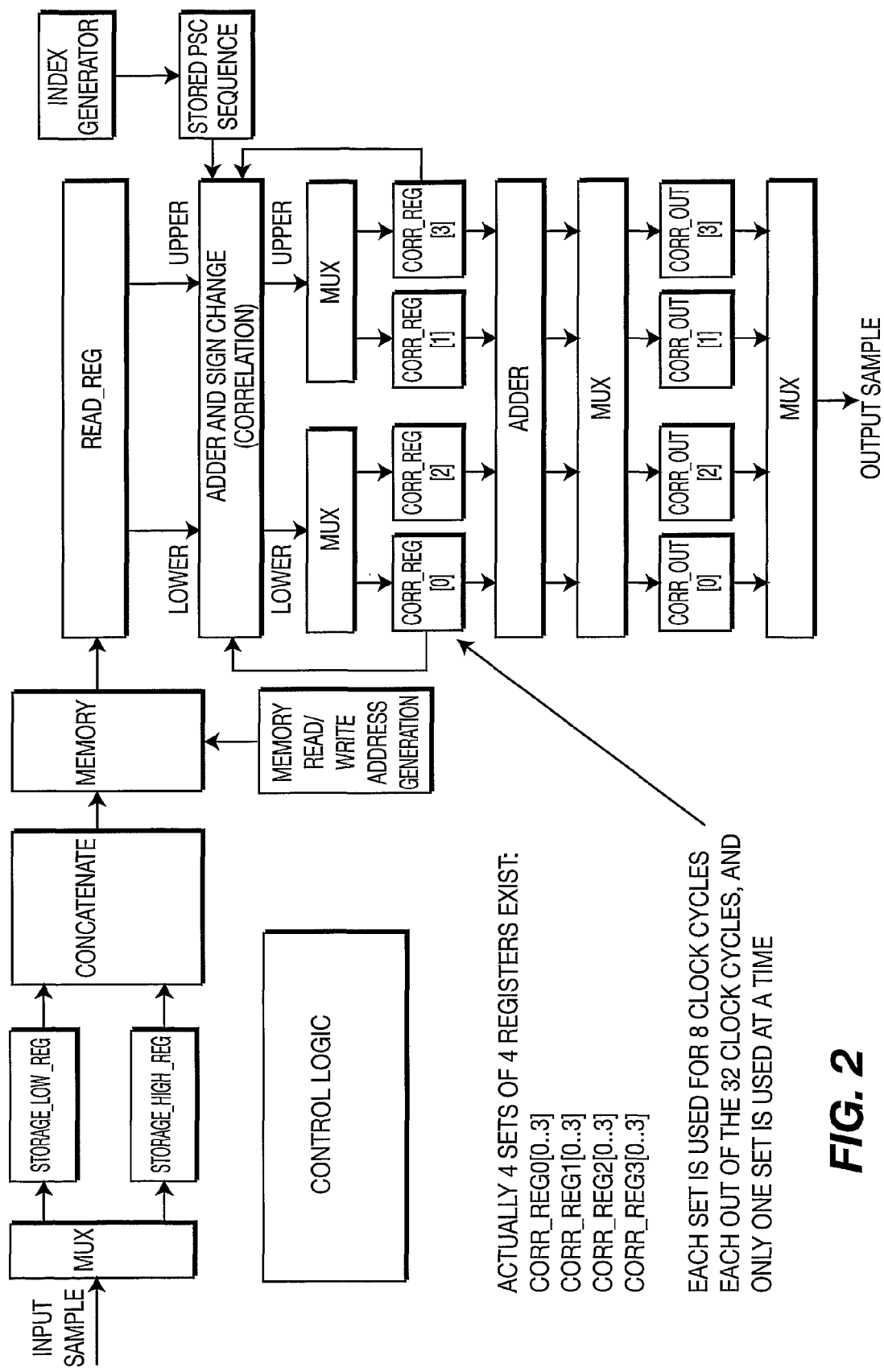
FIG. 2 is a block diagram of the architecture of the present invention.

FIG. 2 is a block diagram of the architecture of the present invention. In particular FIG. 2 is the architecture of the correlators of the present invention used for the second stage of the primary cell search. The correlators of the present invention use a memory architecture, which has the advantage of being area efficient in terms of die space on the ASIC. The Memory Read/Write Address Generation block 235 in FIG. 2 generates the read/write pointer values (also shown in FIG. 3). The second stage correlator 123 of the present invention is actually a pair of second stage correlators 125, 130, which are functionally identical/equivalent. The difference between the pair of second stage correlators 125, 130 is the input data (real values versus imaginary values) received by each of the second stage correlators.

The correlation outputs (real and imaginary) of the first stage correlators (shown in FIG. 1) arrive at the multiplexer 205 in FIG. 2. These samples arrive 4 times per chip and they are alternatively multiplexed into storage registers, first into storage_low_reg 210, then into storage_high_reg 215, and then continue to alternate. Based on logic that will be described in more detail later, the low and high storage register values (each 16 bits wide) are concatenated at block 225 to form a single 32 bit value, which is then written into the memory 230 at a pre-determined clock cycle. This approach is used because of the limitation of only one memory write per clock cycle—by storing two samples as one value, this design enables two samples to be stored in memory 230 for each given clock cycle. The use of memory 230 at this point saves chip die space. Prior art implementations use a bank of registers instead of memory.

The values are then read out of the memory from pre-determined locations and stored into read_reg 240. From that point on, the bits are parsed again into their corresponding upper and lower values and processed as two separate samples. Index generator 245 generates the PSC index/sequence. The correlation is performed in block 255 without area-intensive multipliers by taking the sample from read_reg 240 and either adding or subtracting it from the sample in corr_reg based on the sign of the stored PSC sequence block 250 (i.e., if the PSC sequence is +1, the value is added, if the PSC sequence is −1, the value is subtracted). Note that there are 16 corr_reg registers: corr_reg0[0] to corr_reg0[3] 270a, corr_reg1[0] to corr_reg1[3] 270b, corr_reg2[0] to corr_reg2[3] 270c, and corr_reg3[0] to corr_reg3[3] 270d. This is to enable the storing and processing of 4 simultaneous correlations computed in 4 parallel blocks each. Each set of registers is used for 8 clock cycles of the available 32 clock cycles with only one set of registers being used at a time. The output of block 255 is multiplexed by multiplexers 260, 265 to correlation registers 270a-270d.

After all 16 values for a given correlation are accumulated in adder block 275, the values stored in corr_reg are transferred to one of the 4 corresponding corr_out registers 285a-285d via a multiplexer 280. That is, corr_out[0]=corr_reg0[0]+corr_out1[0]+corr_reg2[0]+corr_reg3[0] 285a.

The output of the corr_out registers is multiplexed to the non-coherent combiner 135 of FIG. 1. It is also necessary to take the absolute value (abs) of the contents of the corr_out registers. This block is not shown on FIG. 2 but the function is performed either at the corr_out registers or as an additional block after the multiplexer 290.

The pseudocode shown in Table 1 gives more detail on how the architecture works. Control block 220 of FIG. 2 coordinates and controls the functions and components of the correlator of the present invention. The numbers on the left indicate the clock cycle. The architecture of the present invention is based on a clock cycle structure with 32 clocks per sample.

| Pseudocode |
|---|

Reset code
    rp = 3          // read pointer - 9 bit number
    wp = 1         // write pointer - 9 bit number
    corr_reg[0..3] = 0
    corr_out[0..3] = 0
Correlation Output code
0
    corr_out[0] = corr_reg0[0] + corr_reg1[0] + corr_reg2[0] + corr_reg3[0]
    corr_out[1] = corr_reg0[1] + corr_reg1[1] + corr_reg2[1] + corr_reg3[1]
1
    corr_out[2] = corr_reg0[2] + corr_reg1[2] + corr_reg2[2] + corr_reg3[2]
    corr_out[3] = corr_reg0[3] + corr_reg1[3] + corr_reg2[3] + corr_reg3[3]
Sample Output code
7
    samp_out = abs(corr_out[0])
15
    samp_out = abs(corr_out[1])
23
    samp_out = abs(corr_out[2])
31
    samp_out = abs(corr_out[3])
Memory Input/Output code
0,16
    storage_low_reg = samp_in
8,24
    storage_high_reg = samp_in
    memory write address = wp
    memory data in = storage_high_reg concatenated with storage_low_reg
    wp--
every clock
    read_reg = data_out from memory
Correlation and Memory Interfacing code
0
    update corr_reg3[0] and corr_reg3[1] with samples in read_reg (upper and lower)
    write "read" address to memory for two clock cycles ahead - read address is rp
1
    update corr_reg3[2] and corr_reg3[3] with samples in read_reg (upper and lower)
    write "read" address to memory for two clock cycles ahead - read address is rp–1
    rp = rp + 32
2,4,6,8
    update corr_reg0[0] and corr_reg0[1] with samples in read_reg (upper and lower)
    write "read" address to memory for two clock cycles ahead - read address is rp
3,5,7,9
    update corr_reg0[2] and corr_reg0[3] with samples in read_reg (upper and lower)
    write "read" address to memory for two clock cycles ahead - read address is rp–1
    rp = rp + 32
10,12,14,16
    update corr_reg1[0] and corr_reg1[1] with samples in read_reg (upper and lower)
    write "read" address to memory for two clock cycles ahead - read address is rp
11,13,15,17
    update corr_reg1[2] and corr_reg1[3] with samples in read_reg (upper and lower)
    write "read" address to memory for two clock cycles ahead - read address is rp–1
    rp = rp + 32
18,20,22,24
    update corr_reg2[0] and corr_reg2[1] with samples in read_reg (upper and lower)
    write "read" address to memory for two clock cycles ahead - read address is rp
19,21,23,25
    update corr_reg2[2] and corr_reg2[3] with samples in read_reg (upper and lower)
    write "read" address to memory for two clock cycles ahead - read address is rp–1
    rp = rp + 32
26,28,30
    update corr_reg3 [0] and corr_reg3[1] with samples in read_reg (upper and lower)
    write "read" address to memory for two clock cycles ahead - read address is rp
27,29,31
    update corr_reg3[2] and corr_reg3[3] with samples in read_reg (upper and lower)
    write "read" address to memory for two clock cycles ahead - read address is rp–1
    if not clock cycle = 31
        rp = rp + 32
    if clock cycle = 31
        rp = rp – 482

The reset code of the pseudocode initializes the read pointer (rp) and the write pointer (wp), which are both 9-bit numbers before any other processing starts. The correlation registers (corr_reg) and the correlation output registers (corr_out) are also initialized.

The correlation output code of the pseudocode sets the corr_out registers [0] and [1] to the contents of the corr_reg registers in clock cycle 0 and the corr_out registers [2] and [3] to the contents of the corr_reg registers in clock cycle 1.

The sample output code of the pseudocode provides the output sample (samp_out) of the absolute value (abs) of the corr_out[0] register at clock cycle 7. The sample output code of the pseudocode provides the output sample (samp_out) of the absolute value (abs) of the corr_out[1] register at clock cycle 15. The sample output code of the pseudocode provides the output sample (samp_out) of the absolute value (abs) of the corr_out[2] register at clock cycle 23. The sample output code of the pseudocode provides the output sample (samp_out) of the absolute value (abs) of the corr_out[3] register at clock cycle 31.

At clock cycles 0 and 16, the memory input/output code of the pseudocode sets the storage_low_reg to an input sample (samp_in). At clock cycles 8 and 24, the memory input/output code of the pseudocode sets the storage_high_reg to an input sample (samp_in). Additionally, at clock cycles 8 and 24 the memory write address is set to the write pointer (wp), the memory data in address is set to the storgage_high_reg concatenated with the storage_low_reg and the write pointer is then decremented. At every clock cycle, the read_reg is set to the data_out from memory in accordance with the read addresses generated by memory read/write address generation block 235.

The correlation and memory interfacing code of the pseudocode functions as follows:

At clock cycle 0, corr_reg3[0] and corr_reg3[1] are updated with upper and lower samples in read_reg. The "read" address is written to memory for two clock cycles ahead and the "read" address is equal to rp.

At clock cycle 1, corr_reg3[2] and corr_reg3[3] are updated with upper and lower samples in read_reg. The "read" address is written to memory for two clock cycles ahead and the "read" address is equal to rp−1. The read pointer is then incremented by 32.

At clock cycles 2, 4, 6 and 8, corr_reg0[0] and corr_reg0[1] are updated with upper and lower samples in read_reg. The "read" address is written to memory for two clock cycles ahead and the "read" address is equal to rp.

At clock cycles 3, 5, 7 and 9, corr_reg0[2] and corr_reg0[3] are updated with upper and lower samples in read_reg. The "read" address is written to memory for two clock cycles ahead and the "read" address is equal to ip−1. The read pointer is then incremented by 32.

At clock cycles 10, 12, 14 and 16, corr_reg1[0] and corr_reg1[1] are updated with upper and lower samples in read_reg. The "read" address is written to memory for two clock cycles ahead and the "read" address is equal to rp.

At clock cycles 11, 13, 15 and 17, corr_reg1[2] and corr_reg1[3] are updated with upper and lower samples in read_reg. The "read" address is written to memory for two clock cycles ahead and the "read" address is equal to ip−1. The read pointer is then incremented by 32.

At clock cycles 18, 20, 22 and 24 corr_reg2[0] and corr_reg2[1] are updated with upper and lower samples in read_reg. The "read" address is written to memory for two clock cycles ahead and the "read" address is equal to rp.

At clock cycles 19, 21, 23 and 25, corr_reg2[2] and corr_reg2[3] are updated with upper and lower samples in read_reg. The "read" address is written to memory for two clock cycles ahead and the "read" address is equal to rp−1. The read pointer is then incremented by 32.

At clock cycles 26, 28 and 30, corr_reg3[0] and corr_reg3[1] are updated with upper and lower samples in read_reg. The "read" address is written to memory for two clock cycles ahead and the "read" address is equal to rp.

At clock cycle 27, 29 and 31, corr_reg3[2] and corr_reg3[3] are updated with upper and lower samples in read_reg. The "read" address is written to memory for two clock cycles ahead and the "read" address is equal to rp−1. If this is not clock cycle 31 then increment read pointer by 32. If this is clock cycle 31 then decrement read pointer by 482.

Figure 3:
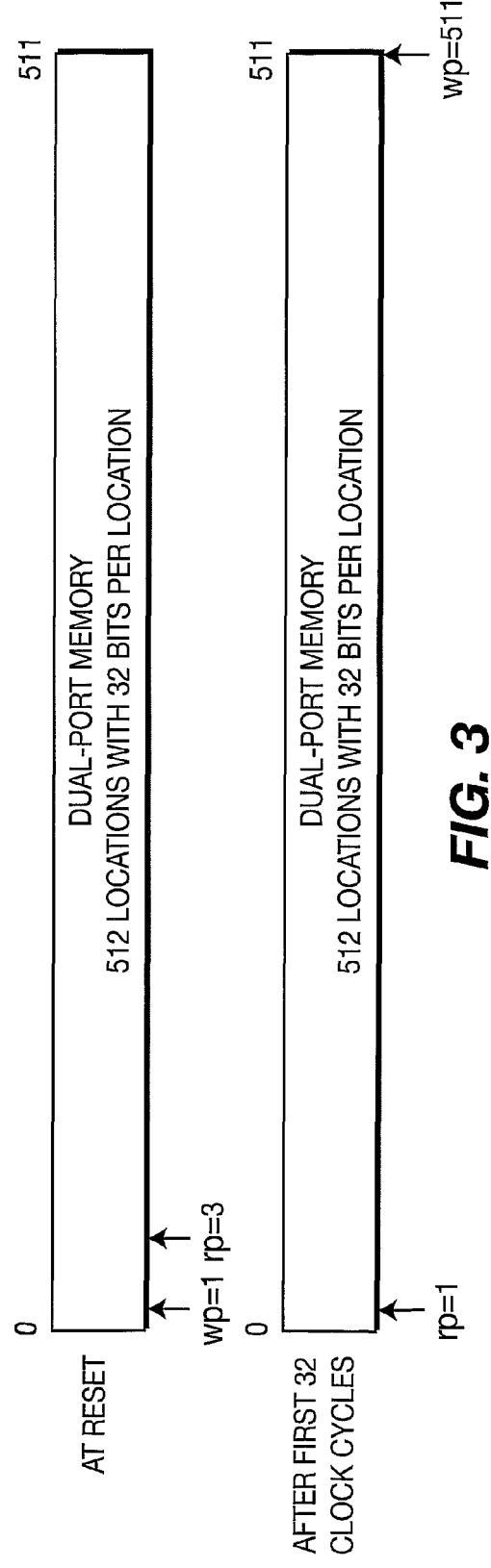
FIG. 3 is one embodiment of the read/write pointer usage for memory in accordance with the principles of the present invention.

Regarding FIG. 3, the write pointer (wp) is initialized to a value of 1, and is decremented twice within each 32 clock cycle period (modulo 512). The read pointer (rp) is initialized to a value of 3, incremented by 32 for 15 times within every 32 clock cycle period and decremented by 482 (512−30) once every 32 clock cycle period. The dual port memory and its use in the present invention is like a sliding window or buffer where read and write pointers are addressing the same memory at different times. That is there is no overlap of the memory locations that are read and the memory locations that are written. This is because there is only one read and one write per clock cycle. The indices of the read and write pointers and the increment and decrement values will change if the number of samples/chip increases or decreases. Specifically, referring to FIG. 3, which depicts the dual port memory having in this example 512 locations, each location being 32 bits, at reset the write pointer (wp) has been initialized to 1 and the read pointer (rp) has been initialized to 3. After the first 32 clock cycles, the write pointer (wp) is 511 and the read pointer (rp) is 1.

Figure 4:
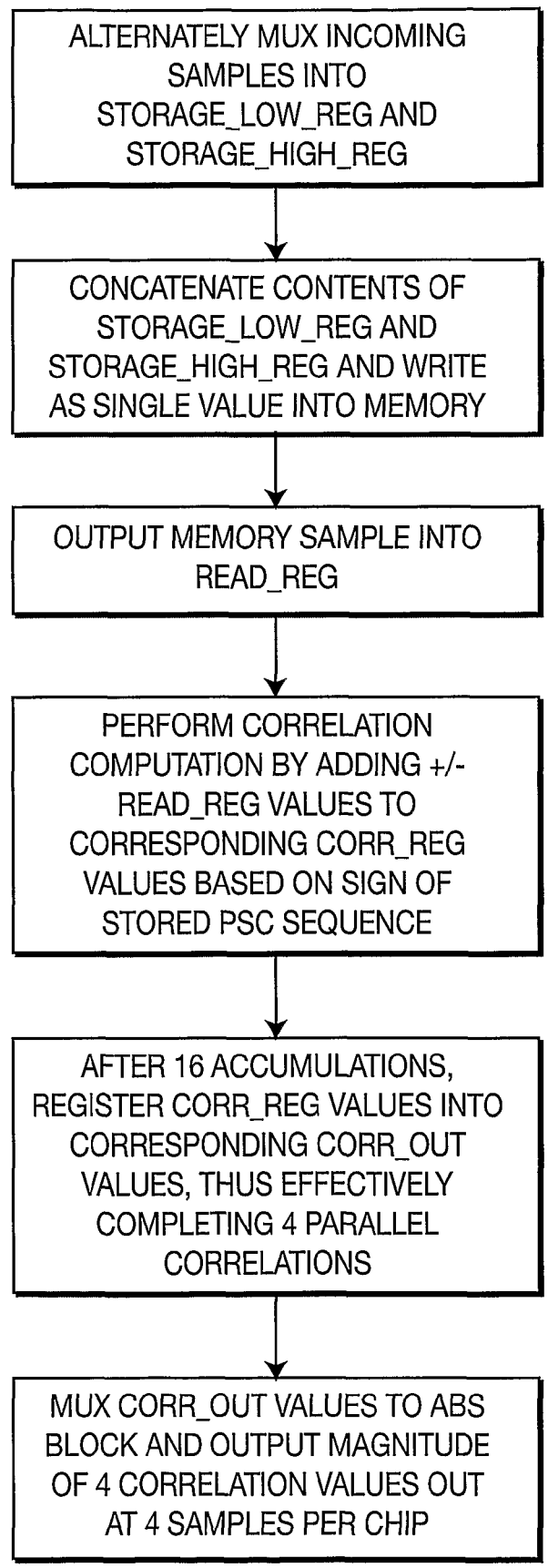
FIG. 4 is a flowchart in accordance with the principles of the present invention.

Referring now to FIG. 4, which is a flowchart of the actions of the second stage correlator of the present invention. At step 405, the samples are alternately multiplexed into storage_reg_low and storage_reg_high. At step 410, the contents of storage_reg_low and storage_reg_high are concatenated and written as a single value into memory in accordance with the write pointer (wp) specified by memory read/write address generation block 235. At step 415, at every clock cycle, a sample from memory 230 is output into read_reg 240 in accordance with the read pointer (rp) specified by memory read/write address generation block 235. The correlation is performed at step 420 by adding (+/−) read_reg 240 values to the corresponding corr_reg 270a-270d values based on the sign of the PSC index/sequence stored in block 250, generated by block 245. At step 425, after sixteen accumulations the corr_reg values are stored into corresponding corr_out 285a-285d registers via adder 275 and multiplexer 280, thus, effectively completing four parallel correlations. The absolute value (abs) of the values in the corr_out 285a-285d registers is taken either at the corr_out 285a-285d registers or the corr_out 285a-285d registers are multiplexed to an absolute value block (not shown) before outputting the correlation values at step 430.

It is to be understood that the present invention may be implemented in various forms of hardware, software, firmware, special purpose processors, or a combination thereof, for example, within a mobile terminal, access point, or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. An apparatus comprising a second stage correlator for receiving input data from a first stage correlator, wherein said second stage correlator includes a dual-port memory coupled to an output of a concatenator of said second stage correlator;
    said second stage correlator further comprises a pair of second stage correlators, further wherein a first one of said pair of second stage correlators receives and processes real valued input data and said second one of said pair of second stage correlators receives and processes imaginary valued input data;
    each of said pair of said second stage correlators further comprises:
    a first multiplexer for receiving input data;
    a first storage register for receiving and storing a first unit of said input data;
    a second storage register for receiving and storing a second unit of said input data;
    a concatenator for concatenating said first unit of input data and said second unit of input data to form concatenated input data;
    a memory for receiving and storing said concatenated input data;
    a read/write address generation unit for generating read/write pointer values for said memory;
    a read register for retrieving and storing said concatenated input data;
    means for parsing said concatenated input data into two separate units of parsed data;
    a plurality of correlation registers;
    an adder and sign changer for performing a correlation by one of adding said parsed data to data in one of said plurality of correlation registers and subtracting said parsed data from data in one of said plurality of correlation registers;
    a second multiplexer for multiplexing output from said adder and sign changer to said plurality of correlation registers;
    a third multiplexer for multiplexing output from said adder and sign changer to said plurality of correlation registers;
    said adder accumulating the correlated values stored in said plurality of correlation registers to form accumulated correlated values;
    a plurality of correlation output registers;
    a fourth multiplexer for multiplexing said accumulated correlated values to one of said plurality of correlation output registers;
    a fifth multiplexer for outputting said accumulated correlated values from said correlation output registers;
    an index generator for generating primary synchronization code index;
    a primary synchronization storage unit for storing a primary synchronization sequence; and
    a control unit for controlling a correlation process.

2. The apparatus according to claim 1, wherein each of said pair of said second stage correlators is functionally equivalent.

3. The apparatus according to claim 1, wherein said primary synchronization unit makes said primary synchronization sequence available to said adder and sign changer in order to determine if said parsed data is added to or subtracted from said data in one of said plurality of correlation registers.

4. The apparatus according to claim 1, wherein said memory is a dual port memory that is written into using a write pointer and read out of using a read pointer.

5. The apparatus according to claim 1, wherein said correlation registers process correlations simultaneously.

6. The apparatus according to claim 1, further comprising a means for performing an absolute value function on said accumulated correlated values.

7. The apparatus according to claim 1, wherein said apparatus is a mobile device.

* * * * *